Dec. 15, 1953

H. M. SPROSS 2,662,687

CENTRIFUGAL SEPARATOR FOR COLD MILK PRODUCTS AND THE LIKE

Filed April 1, 1950

INVENTOR
HUBERT M. SPROSS

By Davis, Hoxie & Faithfull
ATTORNEYS

Dec. 15, 1953 H. M. SPROSS 2,662,687
CENTRIFUGAL SEPARATOR FOR COLD
MILK PRODUCTS AND THE LIKE
Filed April 1, 1950 2 Sheets-Sheet 2

INVENTOR
HUBERT M. SPROSS
BY
Davis, Hoxie & Faithfull
ATTORNEYS

UNITED STATES PATENT OFFICE 2,662,687

CENTRIFUGAL SEPARATOR FOR COLD MILK PRODUCTS AND THE LIKE

Hubert M. Spross, Poughkeepsie, N. Y., assignor to The De Laval Separator Company, New York, N. Y., a corporation of New Jersey Application April 1, 1950, Serial No. 153,408

6 Claims. (Cl. 233—21)

This invention relates to centrifuges for separating liquids according to their relative specific gravities, and it has for its principal object the provision of an improved centrifuge adapted especially for the continuous separation of cream from whole milk at low temperature.

It has long been the general and accepted practice in dairy plants to heat milk, immediately prior to centrifugal separation, to a temperature of 90° F.–92° F. Within this temperature range, the viscosity of the separated cream is sufficiently low to permit its exit from the centrifugal bowl without clogging due to "buttering," a phenomenon well known in the art of separating whole milk into its cream and skim milk components.

The disadvantages of milk separation within this usual and somewhat elevated temperature range are two-fold. There is the added expense for the heating equipment itself and its operation to maintain the milk at the prescribed temperature, and there is a resulting loss of casein from the skim milk. Since some casein in the form of colloidal calcium caseinate begins to precipitate and be centrifugally separable from the whole milk at a temperature of 70° F., any heating beyond this point results in an increasing loss in valuable casein by-products manufactured from the separated skim milk. This loss occurs because the casein is separated as a solid and collects on the bowl wall together with other separated impurity solids. When the bowl is cleaned, the separated solids are thrown away.

With the centrifuge of the present invention, the whole milk can be separated continuously at a temperature within the range of 40° F. to 50° F., and the inherent tendency of the highly viscous separated cream component to clog the bowl is overcome or, at least, greatly reduced.

A centrifuge made according to the invention comprises a stack of conical discs located in the separating chamber of a rotatable centrifugal bowl and forming thin separating spaces between the discs. The discs have central holes, and the bowl chamber has within the edges of these holes a free space which provides unobstructed communication inwardly from the discs toward the rotation axis of the bowl. In order to rotate the discs at the same speed as the bowl, means are provided outside this free space which engage the discs and form a driving connection between the bowl and the discs. The milk product is fed to the separating chamber through an axial feed pipe having an air-tight connection with the bowl, the milk product being delivered from the feed pipe through a feed passage leading to the disc stack at a region spaced outwardly from the free space within the discs. The separated light component or cream is displaced inwardly from the discs into the free space, where it passes without obstruction into a central outlet passage leading from one end of this free space. The skim milk or heavy component separated between the discs passes to the outer part of the bowl and then into a second outlet passage. A stationary discharge pipe outside the bowl communicates with the central or cream outlet passage, and an air-tight seal is provided between the discharge pipe and the bowl to form a closed path from the free space within the discs through the central outlet passage to the discharge pipe. Preferably, the skim milk outlet passage also communicates through an air-tight seal with a second stationary discharge pipe outside the bowl.

By virtue of this combination of air-tight connections with the bowl for the feed and discharge and the free space within the inner edges of the discs, the separated cream can be discharged from the bowl under pressure without clogging it, even when the separated cream component is at relatively low temperature and has a high viscosity. The sealed connections with the bowl for the feed and the discharge enable the use of a relatively high pressure at the inlet side of the bowl, and because of the absence of the usual tubular shaft, disc support, or other obstruction at the inner edges of the discs, the relatively high pressure feed of the milk product is made effective to force the separated cream from the bowl in a continuous stream. In some cases, it is advantageous to provide a branch feed passage leading from the feed pipe directly to the free space within the discs, at the end of this space opposite the central discharge outlet for the cream component, so that some of the milk product is forced under pressure into the free space with a jet action to facilitate further the discharge of the viscous cream.

In the preferred construction, the milk product is fed from the feed pipe into a feed chamber formed by a hollow nave in the bowl, and a hollow tube extends into the inner part of the feed chamber to form a feed passage leading to a set of distributing holes in the discs located some distance outwardly from the free inner edges of the discs. In this way, the milk product is delivered to the disc spaces substantially free of turbulence. Also, the discs are preferably centered in the bowl by radial wings extending inwardly from the bowl periphery and engaging the outer edges of the discs, the latter having notches for receiving the inner edge of one of the wings to provide the driving connection between the bowl and the disc stack. The wings may be formed with openings to permit circulation of the separated skim milk in the outer part of the bowl, in the vicinity of the outlet passage for the skim milk.

In one form of the new centrifuge, the free space within the discs surrounds a tapered axial shaft which supplements the high feed pressure in discharging the viscous cream through the free space.

For a better understanding of the invention reference may be had to the accompanying drawings, in which Fig. 1 is a vertical sectional view of a preferred form of the new centrifuge;

Figure 1:
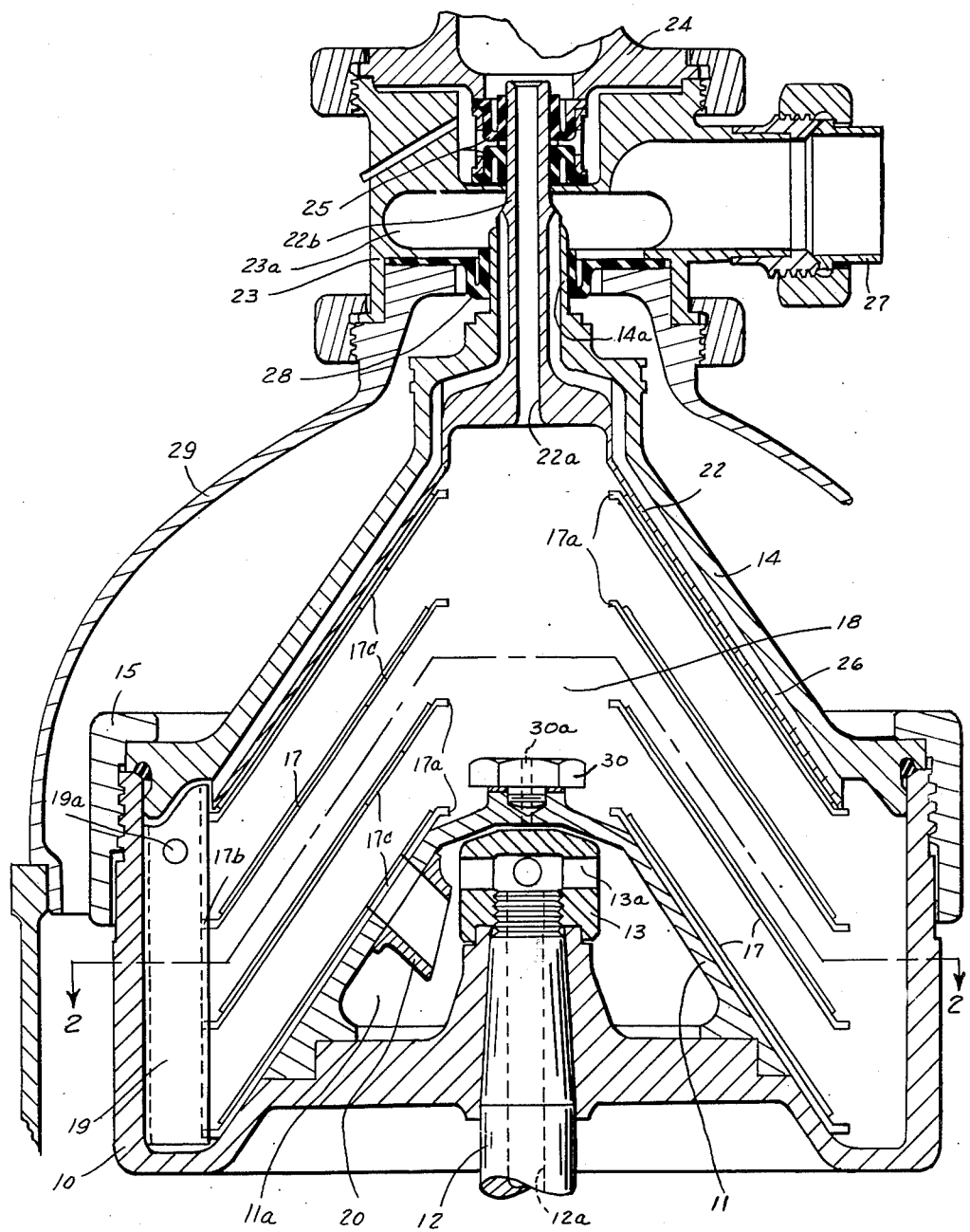

Referring to the drawings, the centrifuge comprises a bowl shell 10 which supports a central hollow nave 11 and is, in turn, centrally supported on and rotated by a hollow spindle 12. Within the nave 11 is a nut 13 for securing the bowl to the spindle. A bowl top 14 is secured to the upper part of the shell by a coupling ring 15 and forms a bowl neck 14a.

A stack of conical discs 17 is mounted in the separating chamber of the bowl, the discs being separated by the usual caulks (not shown) to form thin separating spaces between the discs. It will be understood that the discs are spaced closely together, although for the purpose of clarity I have omitted some of the discs in Fig. 1 of the drawings. The discs have central holes 17a, the edges of which define a free central space in a separating chamber of the bowl. That is, the central space 18 provides unobstructed communication between the rotation axis of the bowl and the discs 17. Since the inner edges of the discs are free, I provide outside the central space 18 means for centering the discs in the bowl and driving them at the same speed as the bowl. Such means, as shown, comprise circumferentially spaced wings 19 welded or otherwise secured to the bowl periphery. The wings extend radially inward into engagement with the outer edges of the discs, which are formed with notches 17b for receiving the inner edge of one of the wings 19 and thereby form a driving connection between the bowl and the disc stack.

The whole milk is fed into a central passage 12a in the spindle 12. The upper portion of the spindle is tapered and fits closely in the bottom of the bowl. Thus, the spindle serves as an axial feed pipe having an air-tight connection with the bowl. The whole milk is delivered under pressure into the lower end of the spindle from a fixed pipe through a conventional sealed connection (not shown) such as that illustrated in Lindgren Patent No. 1,901,461. From the hollow spindle 12, the whole milk passes through openings 13a in the nut 13 into a feed chamber 11a formed by the nave 11. Hollow tubes 20 extend from the wall of the nave into the inner part of the feed chamber 11a and form feed passages leading upward and outward to vertically aligned distributing holes 17c in the discs, these holes being located a short distance outward from the central free space 18.

Above the discs 17 is a top disc 22 forming a central outlet passage 22a leading upward through an inner neck 22b from the central free space 18. The central neck or tube 22b of the top disc extends upward into a stationary head 23 mounted on the frame of the centrifuge, and it communicates with a stationary discharge pipe 24 secured to the head. Between the discharge pipe 24 and the bowl is an air-tight seal comprising rubber rings or packings 25 closely surrounding the tube 22b and held within the stationary head 23. In this way, a closed path is provided for the separated cream from the upper end of the free central space 18 through the central outlet passage 22a to the discharge pipe 24.

The top disc 22 forms with the bowl top 14 a number of passages 26 extending inwardly and upwardly from the outer zone of the separating chamber at the region of the outer edges of the discs 17. The passages 26, which may be separated from each other by wings on one of the members 14 and 22, extend between the tube 22d and the neck 14a, the passages opening into a space 23a in the head 23. The space 23a communicates with a fixed discharge pipe 27 for the skim milk or heavy component. Between the discharge pipe 27 and the bowl is an air-tight seal comprising the rings 25 above the space 23a and a rubber packing or ring 28 below this space. The ring 28 closely surrounds the neck 14a and is secured between the head 23 and the stationary cover 29. Thus, a closed path for discharging the separated skim milk is provided from the outer part of the separating chamber through passages 26, head 23 and discharge pipe 27, and this path is sealed from the discharge path for the cream.

A nut 30 is threaded centrally in the upper part of the nave 11 and serves to assist in the removal, as a unit, of the stack of discs 17 from the bowl. When the bowl is opened for cleaning, by removing the top 14, a hook may be inserted through the central free space 18 within the disc stack to grasp the underside of the nut 30, or the nut may be removed and a lifting tool threaded in its place.

In the operation of the centrifuge, the milk product is delivered under pressure through the hollow spindle or feed pipe 12 into the distributing holes 17c of the discs in the separating chamber, by way of the passages previously described. In the thin layers or spaces between the discs, the skim milk is separated from the cream and passes outwardly to the outer zone of the bowl chamber in the region of the disc-supporting wings 19, from which it is discharged through the closed path previously described. The separated cream is displaced inwardly into the central free space 18 within the disc stack. In this space, the feed pressure is effective to force the viscous cream upwardly into and through the closed cream path leading to discharge pipe 24, since the central space 18 contains no obstructions to the cream flow. If desired, a central by-pass feed passage 30a may be formed through the top of the nave 11 and the nut 30, so that the feed pressure will cause a relatively small amount of the feed to enter directly into the bottom of the free central space 18 with a jet action, to assist further in discharging the cream from the bowl.

It will be understood that according to the invention the centrifugal separation of cold milk (or other products in which the separated light component has a strong tendency to plug the bowl) is made possible by the combination of the air-tight connections of the feed and discharge pipes to the bowl and the free central space 18 within the disc stack. By centering and driving the discs from the outside, instead of from the inside as in conventional designs, the highly viscous cream is forced through the central part of the bowl by the feed pump without contacting any rotating part in the space 18, which would tend to agitate the cream and impede the action of the feed pressure in discharging it. It will be noted that the inner flange of each disc 17 is in a horizontal plane and presents an unbroken surface to the flow of the cream component.

The disc-supporting wings 19 may be formed with holes 19a near the outlet passages 26, for circulation of the skim milk component. Also, the rate of discharge of separated cream may be controlled by a valve system in pipe 24, as disclosed in Hapgood Patent No. 2,160,140.

Figure 2:
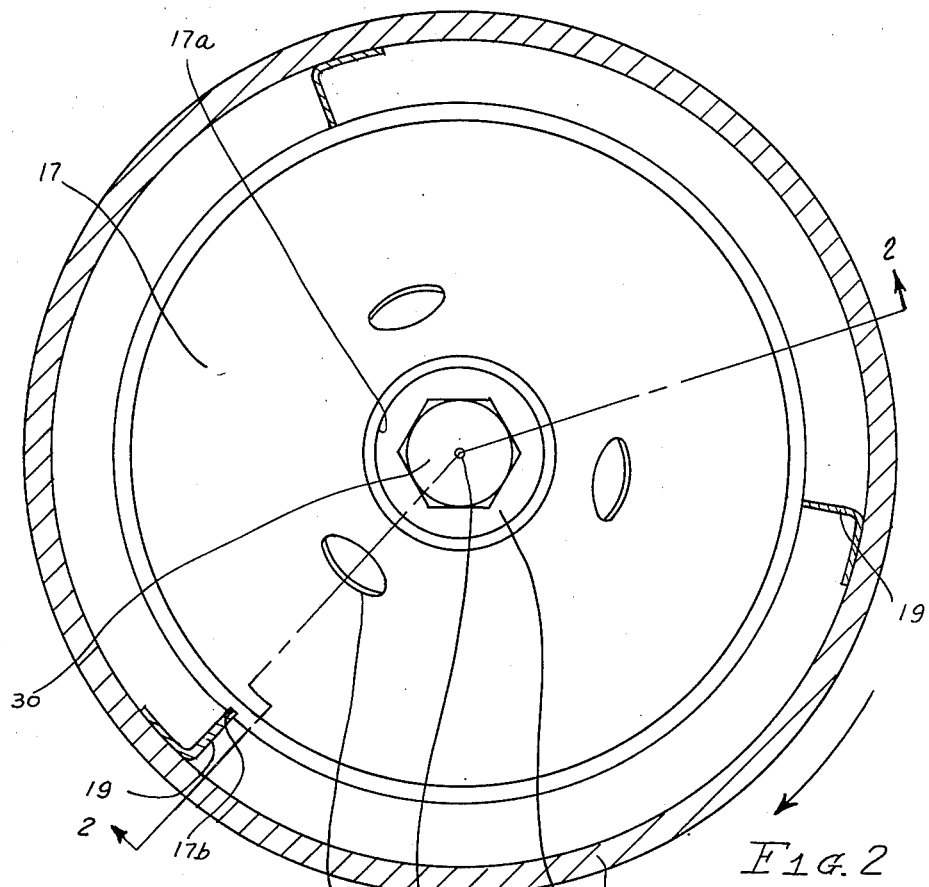
Fig. 2 is a horizontal sectional view on the line 2—2 in Fig. 1.
Figure 3:
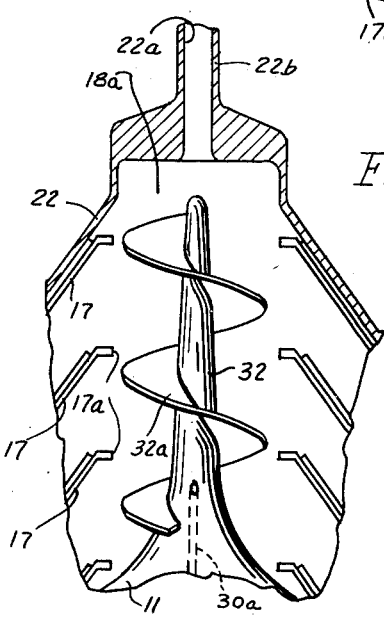
Fig. 3 is a vertical sectional view of part of a modified form of the bowl.

In the modified form of the bowl illustrated in Fig. 3, the free space 18a within the discs does not extend inwardly as far as the rotation axis of the bowl, as in the previously described form. Instead, the free space 18a surrounds as axial upwardly-tapered shaft 32 of small diameter which is supported by and rotates with the nave 11. The shaft 32 is secured to the top of the nave (in place of the nut 30 illustrated in Figs. 1 and 2) and extends upwardly toward the outlet passage 22a throughout most of the vertical extent of the free space 18a. A wing 32a of the Archimedes screw type is secured to the periphery of shaft 32 and spirals upwardly around the shaft in the same direction as the rotation of the bowl. Thus, since the cream in the free space 18a rotates at a higher angular speed than the bowl, due to "run-ahead" between the cream and the bowl, the wing 32a acts to force the cream upwardly toward the discharge passage 22a and thereby supplement the feed pressure in expelling the cream from the bowl.

While I prefer the use of the helical wing 32a on the shaft 32, this wing can be eliminated if desired. The upward taper of the shaft 32, in conjunction with the high feed pressure, serves in itself to facilitate discharge of the cream from the free space 18a.

I claim:

1. In an air-tight centrifuge, the combination of a rotatable centrifugal bowl having a separating chamber, a stack of conical discs in the chamber forming thin separating spaces between the discs, the discs having central holes and the bowl chamber having within the edges of said holes a free space providing unobstructed communication inwardly from said edges toward the rotation axis of the bowl, said free inner space extending continuously through the disc stack and continuously around said edges, means outside said free space engaging the discs and forming a driving connection between the bowl and the discs, an axial feed pipe having an air-tight connection with the bowl, the bowl having a feed passage communicating with said pipe for leading the feed to the disc stack at a region spaced outwardly from said free space, the bowl also having a central light component outlet passage leading from one end of said free space and a heavy component outlet passage leading from the outer part of the separating chamber, a stationary discharge pipe outside the bowl and communicating with the central outlet passage, and an air-tight seal between the discharge pipe and the bowl to provide a closed path from said free space through the central outlet passage to the discharge pipe.

2. The combination according to claim 1, in which said disc engaging means include a wing extending generally radially from the outer edges of the discs to the bowl periphery and engaged in peripheral notches in the discs to form said driving connection.

3. The combination according to claim 1, in which the bowl also has a narrow branch feed passage communicating with the feed pipe and forming a jet leading directly to the end of said free space opposite the central outlet.

4. The combination according to claim 1, in which the bowl also has a feed chamber between the feedpipe and said feed passage, and a hollow tube extending into the inner part of the feed chamber and forming said feed passage.

5. The combination according to claim 1, comprising also a hollow nave in the bowl forming a feed chamber between the feed pipe and the feed passage, the nave having a narrow central top opening forming a jet feed passage leading directly into the lower end of said free space, said central outlet passage leading from the upper end of said free space.

6. The combination according to claim 1, in which said free space extends inwardly from the discs to the rotation axis of the bowl.

HUBERT M. SPROSS.

References Cited in the file of this patent

UNITED STATES PATENTS

| Number | Name | Date |
|---|---|---|
| 547,404 | Springer | Oct. 1, 1895 |
| 1,422,856 | Hapgood | July 18, 1922 |
| 1,427,486 | Lindgren | Aug. 29, 1922 |
| 1,916,870 | Strezynski | July 4, 1933 |
| 1,945,336 | Strezynski | Jan. 30, 1934 |
| 2,002,954 | Lindgren | May 28, 1935 |
| 2,089,043 | Svensto | Aug. 3, 1937 |
| 2,089,122 | Jones | Aug. 3, 1937 |
| 2,173,580 | Fawcett | Sept. 19, 1939 |
| 2,222,727 | Stigen | Nov. 26, 1940 |

FOREIGN PATENTS

| Number | Country | Date |
|---|---|---|
| 476,823 | Great Britain | Dec. 16, 1937 |